(12) United States Patent
Longstaff (10) Patent No.: US 8,427,360 B2
(45) Date of Patent: Apr. 23, 2013

(54) APPARATUS AND METHOD FOR ASSISTING VERTICAL TAKEOFF VEHICLES

(76) Inventor: Dennis Longstaff, West End (AU)

( * ) Notice: Subject to any disclaimer, the term of this patent is extended or adjusted under 35 U.S.C. 154(b) by 128 days.

(21) Appl. No.: 13/190,106

(22) Filed: Jul. 25, 2011

(65) Prior Publication Data

US 2011/0279669 A1     Nov. 17, 2011

Related U.S. Application Data

(63) Continuation of application No. PCT/AU2010/000082, filed on Jan. 28, 2010.

(30) Foreign Application Priority Data

Jan. 30, 2009 (AU) ................................ 2009900337

(51) Int. Cl.
    *G01S 13/08*      (2006.01)

(52) U.S. Cl.
    USPC .............................. 342/65; 342/120; 340/945

(58) Field of Classification Search .................... 342/29, 342/33–35, 38, 65, 120–122; 340/945, 963, 340/966–967
See application file for complete search history.

(56) References Cited

U.S. PATENT DOCUMENTS

| 3,842,417 | A | | 10/1974 | Williams |
| 3,924,236 | A | | 12/1975 | Earp et al. |
| 4,016,565 | A | * | 4/1977 | Walker ........................ 342/105 |
| 4,571,591 | A | | 2/1986 | Valentino et al. |
| 4,612,547 | A | | 9/1986 | Itoh |
| 4,758,839 | A | * | 7/1988 | Goebel et al. ................ 342/122 |
| 5,038,150 | A | | 8/1991 | Bains |
| 5,465,142 | A | | 11/1995 | Krumes et al. |
| 5,657,024 | A | | 8/1997 | Shingyoji et al. |
| 5,790,071 | A | | 8/1998 | Silverstein et al. |
| 5,828,332 | A | * | 10/1998 | Frederick .................... 342/26 B |
| 5,845,024 | A | | 12/1998 | Tsushima et al. |
| 5,920,276 | A | * | 7/1999 | Frederick .................... 342/26 B |
| 6,104,346 | A | | 8/2000 | Rudish et al. |
| 6,215,443 | B1 | | 4/2001 | Komatsu et al. |

(Continued)

FOREIGN PATENT DOCUMENTS

| EP | 1441236 A1 | * | 7/2004 |
| EP | 2144085 A1 | * | 1/2010 |

(Continued)

OTHER PUBLICATIONS

U.S. Appl. No. 12/611,660, filed Nov. 2009, Longstaff.

(Continued)

*Primary Examiner* — John B Sotomayor
(74) *Attorney, Agent, or Firm* — McGuireWoods, LLP (57) ABSTRACT

According to one aspect of the present invention, there is provided a radar altimeter which utilizes a downward looking MIMO phased array to form multiple beams, covering a relatively wide sector, e.g., +/−60 degrees or thereabouts. The distance to the ground is then measured in each beam allowing the ground profile to be formed. The beams may be tilted forward to cover from about +90 degrees forward (horizontal) to about 30 degrees behind nadir. The provision of such a forward tilt gives a greater degree of coverage in the direction of approach vector to the ground. This additional cover enables the altimeter to more accurately detect other vehicles in the proximity to the current approach vector of the vehicle to the desired landing zone.

33 Claims, 4 Drawing Sheets

U.S. PATENT DOCUMENTS

| | | | |
|---|---|---|---|
| 6,246,365 | B1 | 6/2001 | Tokoro |
| 6,433,729 | B1* | 8/2002 | Staggs .......................... 342/29 |
| 6,437,750 | B1 | 8/2002 | Grimes et al. |
| 6,527,456 | B1 | 3/2003 | Trezza |
| 6,664,529 | B2 | 12/2003 | Pack et al. |
| 6,792,171 | B2 | 9/2004 | Hargis et al. |
| 6,850,183 | B2 | 2/2005 | Reeves et al. |
| 6,851,870 | B1 | 2/2005 | Deng et al. |
| 6,889,010 | B2 | 5/2005 | Trezza |
| 7,011,455 | B2 | 3/2006 | Luo et al. |
| 7,095,488 | B2* | 8/2006 | Jamieson et al. ............ 356/5.01 |
| 7,106,217 | B2 | 9/2006 | Judge et al. |
| 7,149,147 | B1 | 12/2006 | Goldman et al. |
| 7,306,377 | B2 | 12/2007 | Ellison |
| 7,391,362 | B2 | 6/2008 | Beckner |
| 7,456,779 | B2 | 11/2008 | Cross et al. |
| 7,668,374 | B2 | 2/2010 | Harder et al. |
| 7,978,120 | B2 | 7/2011 | Longstaff |
| 2003/0043058 | A1* | 3/2003 | Jamieson et al. ............ 340/961 |
| 2003/0193410 | A1* | 10/2003 | Chen et al. ................... 340/971 |
| 2004/0141170 | A1* | 7/2004 | Jamieson et al. ............ 356/5.01 |
| 2005/0253750 | A1* | 11/2005 | Hager et al. .................. 342/120 |
| 2006/0290531 | A1* | 12/2006 | Reynolds et al. ............ 340/961 |
| 2007/0086657 | A1 | 4/2007 | Harder et al. |
| 2007/0139248 | A1 | 6/2007 | Baharav et al. |
| 2007/0140174 | A1 | 6/2007 | Proctor |
| 2008/0071169 | A1 | 3/2008 | Craddock et al. |
| 2008/0074307 | A1 | 3/2008 | Boric-Lubecke et al. |
| 2008/0074312 | A1 | 3/2008 | Cross et al. |
| 2010/0164784 | A1 | 7/2010 | Longstaff |
| 2010/0204867 | A1* | 8/2010 | Longstaff ........................ 701/26 |
| 2011/0101239 | A1* | 5/2011 | Woodhouse et al. ...... 250/458.1 |

FOREIGN PATENT DOCUMENTS

| | | |
|---|---|---|
| WO | WO 2007/045026 | 4/2007 |
| WO | WO2007/082335 A1 | 7/2007 |
| WO | WO2009/036507 | 3/2009 |
| WO | WO 2010/085846 | 10/2010 |

OTHER PUBLICATIONS

U.S. Appl. No. 12/161,290, filed Oct. 2008, Longstaff.

International Search Report mailed Nov. 21, 2008 for PCT Application PCT/AU2008/001386.

Bliss, D.W. Forsythe, K. W.:"MIMO Radar Medical Imaging: Self Interference Mitigation for Breast Tumor Detection" , Signals, Systems and Computers 2006, ACSSC '06. Fortieth Asilornar Conference on , Oct.-Nov. 2006, p. 1558-1562.

Liu, Bo Chan, Chunlin Liu, Benyoung: "Receiving Signal Processing of Wideband MIMO Radar Based on Transmitting Diversity", Radar, 2006. CIE '06 International Conference on. Oct. 2006. p. 1-4.

Bliss, D,W. Forsythe K .W..: "Multiple-Input Multiple Output (MIMO) Radar and Imaging: Degrees of Freedom And Resolution", Signals, Systems and Computers 2003, Conference Record on Thirty Seventh Asilomar Conference on, Nov. 9-12, 2003, p. 54-59 vol. 1.

Chu-Yang Chen Vaidyanathan, P.P.: "A Subspace Methodfor MIMO Radar Space-Time Adaptive Processing" Acoustics, Speech and Signal Processing, 2007. ICASSP 2007. IEEE International Conference on. Apr. 15-20, 2007, vol. 2, p. II-925-928.

IEEE Xplore Release 2.5; http://ieeexplore.ieee.org/xpls/absprintf. jsp?arnumber=1291865; Multiple-Input Multiple Output (MIMO) Radar and Imaging: Degrees of Freedom and Resolution; Bliss D.W. Forsythe K.W. Lincoln Lab., MIT, Lexington MA,USA.

IEEE Xplore Release 2.5; http://ieeexplore.ieee.org/xpls/absprintf. jsp?arnumber=4176830; MIMO Radar Medical Imaging: Self Interference Mitigation for Breast Tumor Detection; Bliss, D.W. Forsythe, K.W. MIT Lincoln Laboratory, Lexington, MA.

IEEE Xplore Release 2.5; http://ieeexplore.ieee.org/xpls/absprintf. jsp?arnumber=4217561; A Subspace Method for MIMO Radar Space-Time Adaptive Processing; Chun-Yang Chen Vaidyanathan, P.P. Dept of Electr. Eng., California Inst of Technol., Pasadena CA.

IEEE Xplore Release 2.5; http://ieeexplore.ieee.org/xpls/absprintf. jsp?arnumber=4148263; Receiving Signal Processing of Wideband MIMO Radar Based on Transmitting Diversity; Liu, Bo Han, Chunlin Liu Benyong Institute of Electronic Engineering, University Electronic Science and Technology of China, Chengdu, China.

Vaskelainen, L.J., "Virtual Array Synthesis Method for Planar Array Antennas," IEEE Transactions of Antennas and Propogation, vol. 46, No. 3, Mar. 1998. pp. 391-396.

International Search Report and Written Opinion of the International Searching Authority from International Application No. PCT/AU2007/000033, mailed on Feb. 15, 2007.

Donnet, B.J.; Longstaff, I.D., MIMO Radar, Techniques and Opportunities. Sep. 13-15, 2006, Radar Conference, 2006. EuRAD 2006, $3^{rd}$ European, 112-115.

Bo Liu; Chunlin Han; Benyonng Liu, Receiving Signal Processing of Wideband MIMO Radar Based on Transmitting Diversity, Oct. 16-19, 2006, Radar, 2006. CIE '06. International Conference, 1-4.

2000 Annual Report, Teledyne Technologies.

Golden Shu, et al., "Design and Evaluation of Fiber Tip Lenses for Fiber Optic Transmitter and Receiver Applications," IEEE 2007.

International Search Report mailed on related PCT/AU2010/000082, mailed on Aug. 27, 2010.

* cited by examiner

APPARATUS AND METHOD FOR ASSISTING VERTICAL TAKEOFF VEHICLES

CROSS REFERENCE TO PRIOR APPLICATIONS

This application is a continuation of International Application PCT/AU2010/000082, published as WO 2010/085846, with an international filing date of Jan. 28, 2010, which claims priority from Australian Patent Application No. 2009/900337, filed Jan. 30, 2009, all of which are hereby incorporated herein by reference for all purposes as if fully set forth herein.

BACKGROUND OF THE INVENTION

1. Field of the Invention

The present application relates to apparatus and methods for assisting operators of vertical takeoff vehicles in landing operations within environments of low visual acuity. In particular although not exclusively the present application relates to a radar altimeter for assisting in landing operations of vertical takeoff vehicles.

2. Discussion of the Background Art

Many incidents and accidents involving the use of vertical takeoff vehicles occur frequently during takeoff and landing operations. Given the complex mechanics of the vehicles involved a wide array of variables can influence the success of these operations. Numerous accidents causing anywhere form minor damaged or at worst destruction of the vehicle have resulted from environmental factors such as terrain type, wing and rotor clearance etc.

One cause of accidents in landing operations is setting the vehicle down on steep or uneven terrain. From the air it can be difficult to sight imperfections in the landing area. Setting the craft down on steep or uneven surfaces can cause the craft to pitch and tip over. Another major factor in terms of the terrain type, which can affect landing and takeoff operations, is the composition of the landing/takeoff surface. For example in arid landing and takeoff environments sand, dust and other debris can be kicked up into the air by the down☐draft created by the vehicle. This situation is known as a "brownout". In essence the debris that is kicked up into the air creates a cloud which can completely obscure the operators view to the landing zone and surrounding landmarks.

In the case of vehicles such as a helicopter, the increased turbulence created by the rotors (rotor wash) can create eddy currents within the particulate cloud. The swirling mass of particles can lead the pilot to experience the vection illusion, a form of spatial disorientation where the helicopter appears to be turning when it is actually in a level hover. A pilot not using the flight instruments for reference may instinctively try to level the aircraft, resulting in an accident.

The brownout problem has been keenly noted by the US military. Since 1991, there have been over 230 cases of aircraft damage and/or injury due to unsuccessful take-offs or landings in arid environments. Although the majority of the incidents occur during landing, there have been a significant number of incidents occurring during takeoff. Of the more than 50 brownout incidents occasioning damage reported during the period of 2001-2007, 80 percent were during landings and 20 percent during takeoffs. On average the number of brownout incidents occasioning damage costs the US military US$100 million per year.

In addition to the brownout problem a large number of helicopter operations are carried out under the cover of darkness. Typically these operations require helicopters to minimise their presence by flying low and without lights. During such operations pilots become more dependent upon their instruments and limited information regarding terrain from night vision systems (if available).

One piece of equipment which can provide a pilot with valuable information in both brownout conditions and night time operations is a radar altimeter. The basic radar altimeter utilises a radar ranging system which measures the time delay of the signal reflected from the nearest object within a single wide beam illuminating the ground. This wide-beam is intended to monitor aircraft height even when in a bank or flying near steep slopes.

One example of a radar altimeter is shown in U.S. Pat. No. 5,047,779 to Hager which is capable of tracking at least two targets. The altimeter of Hager information relating to the first target is captured via a first set of radar antennas and stored before the altimeter switches to a track and store information of the second target via a second set of radar antennas. U.S. Pat. No. 6,750,807 also to Hager et al describes a similar scheme, but with a forward-looking scanning beam for obstacle warning. Both arrangements proposed in Hager patents simply provide range information to both targets and as such are generally useful in assisting a pilot with obstacle avoidance in flight. Neither of the altimeter Hager patents is capable of providing the pilot of any useful information regarding the tomography of the desired landing surface.

One approach to assisting pilots with obstacle avoidance in degraded visual conditions is discussed in U.S. Pat. No. 7,106,217 to Judge et al. The approach of Judge relies on merging data from a number of sensors to allow a display and fly-by-wire capability in poor visibility. While the system of Judge is capable of assisting a pilot with identifying the position of the aircraft relative to the select landing zone and any obstacles within range of the aircraft, it does not provide the pilot of any useful information regarding the topography of the desired landing surface.

Thus it would be advantageous to provide a system and method that would not only assist an operator of a vertical takeoff vehicle in identifying obstacles in flight and around a landing zone, but also provides the operator with information on the topography of the landing surface. It would also be advantageous to provide a system and method that is capable of producing accurate information regarding the topography of the landing surface in conditions of minimal visual acuity.

SUMMARY OF THE INVENTION

Disclosure of the Invention

Accordingly in one aspect of the present invention there is provided an imaging system for profiling an area of interest, said system comprising: a plurality of transmitter elements, wherein each transmitter element transmits a plurality of coded signals toward the area of interest; a plurality of receiver elements, each receiver element receiving a plurality of return signals corresponding to the transmitted coded signals from the area of interest; and at least one processor, said processor being adapted to: separate the return signals for each transmitter to receiver path received by each of the receiver elements to form a plurality of data channels; form a plurality of beams from the plurality of data channels by co-phasing the data channels to remove phase shifts associated with each of the received signals angle of arrival and sum each set of return signals received by each receiver and wherein each beam includes a first return signal; produce a set of range profiles from the data contained in each of the plurality of beams; measure the distance to the nearest point in each beam based on delay time of the first return signal from each beam; produce a profile of the area of interest based on the measured distances; and display an image of the profile of the area of interest.

In yet another aspect of the present invention there is provided a method of surveying an area of interest to produce a terrain profile, said method comprising the steps of: transmitting from a plurality of transmitter elements a plurality of coded signals toward the area of interest; receiving at a plurality of receiver elements, a plurality of return signals corresponding to the transmitted coded signals from the area of interest; and separating the return signals for each transmitter receiver path received by each of the receiver elements to form a plurality of data channels; forming a plurality of beams from the plurality of data channels by co-phasing the data channels to remove phase shifts associated with each of the received signals angle of arrival and sum each set of return signals received by each receiver; producing a set of range profiles from the data contained in each of the plurality of beams; measuring the distance to the nearest point in each beam based on the time delay of the earliest return signal from each beam; produce a terrain profile of the area of interest from the distance measurements; and displaying the terrain profile.

The plurality of coded signals transmitted by the transmitters, may each have a different signature code allowing the receiving elements to separate out return signals for each transmitting element reflected from the area of interest. The coded signals may be transmitted in accordance with a suitable multiplexing scheme such as time division multiplexing (TDM), frequency division multiplexing (FDM), code division multiplexing (CDM), or combinations of these.

Suitably the delay between the transmission of each coded signal is sufficient to allow all return signals from the area of interest to dissipate before the transmitting the next coded signal. The coded signals may each have a different signature code. Each signature code may be formed by a linear frequency sweep at staggered intervals. Alternately each signature code may be formed as a differing code sequence of pulses at the same frequency. Suitably each signature code may coded by applying phase or amplitude modulations. Preferably each signature code may have a unique carrier frequency selected from a set of predetermined frequencies.

The carrier frequencies of the coded signals maybe cycled incrementally after each transmission, such that each transmitter element transmits a full set of pulses covering all the predetermined frequencies. The transmission of the coded signals may be staggered, whereby each transmitter element transmits a different carrier frequency within the sequence of coded signals to that off the adjacent transmitter element/s. Suitably the pulses are transmitted in the microwave or millimetre portions of the electromagnetic spectrum.

Preferably the transmitter and receiver elements have patterns covering 60 degrees in along track and cross track. The transmitter and receiver element patterns may be tilted forward to cover from +90 degrees forward-horizontal to 30 degrees behind nadir. Suitably the transmitter and receiver elements have the same polarisation. The transmitter and receiver elements may be formed into transmitter and receiver sub-arrays arranged orthogonal to one another. Suitably the spacing between the elements is about half a wavelength. Each element within the sub-arrays may be connected in series to reduce the number of active devices. Preferably the transmitter and receiver sub-arrays are arranged to form planar array wherein the transmitter and receiver elements are positioned adjacent to the array perimeter. The planar array may define any suitable closed planar shape such as a circle, square, rectangle, octagon or the like.

The terrain profile may be displayed as a contour or mesh plot. Suitably the terrain profile maybe further processed to determine a substantially level area within the area of interest, which may then be identified on the displayed contour or mesh plot. A warning may be displayed if no substantially level area can be identified. The warning may also include an audible warning.

The imaging system may also compare the terrain profile with a threshold value denoting the level clearance and flatness to safely land an aircraft within the area of interest and display suitable and unsuitable areas to the aircrafts operator.

Where a frequency division multiplexing scheme is utilised to transmit the coded signals, a constant frequency separation is employed between the carrier frequencies of each pulses (i.e. the spacing between the carrier frequencies of each pulse in the frequency domain is identical). Preferably a variety of pulse compression techniques such as step-frequency range compression can be employed to further improve range resolution.

Where a code division multiplexing scheme is utilised to transmit the coded signals, the chosen coding scheme should preferably have codes which produce low time sidelobes after auto-correlation (range compression) and low or zero resultant if cross-correlated against others in the set used.

Preferably the synthesis of the multiple beams is conducted in accordance with a coherent Multiple input Multiple Output (MIMO) processing technique. Suitably the MIMO processing includes the steps of converting the distance between each transmitter element, and each receiver element to a delay time and then removing the delay time from the received signals, before weighting and summing the pulses and signals from all the transmitter and receiver element pairs.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

In order to produce a finely detail ground profile image via radar a multiplicity of beams is required. This conventionally requires a scanning dish antenna or phased array radar with many antenna elements and associated scanning electronics, making such systems complex and expensive.

An alternative approach to the formation of multiple beams is to utilise Multiple Input Multiple Output (MIMO) technique in association with orthogonal or near orthogonal transmitter and receiver antenna arrays. The MIMO technique makes use of the fact that the signal received from the far field with a bi-static transmitter receiver pair is identical to the signal which would be received by a single mono-static transmit/receive element placed at the mid point between the bi-static pair. For convenience, where the targets are in the far field, the image computation can be based on the geometry arising from a notional plurality of transient elements. The technique can also be used for signals from the nearer field, but additional processing is required to account for an ellipsoidal co-phase surface with the bi-static elements at the foci. In the far field this ellipsoid tends to a spherical surface centered on a synthetic element at the mid-point.

The formation of multiple beams under MIMO processing is only possible where each receiver element is able to separate the return signals in order to match them to the corresponding signals transmitted from each transmitter element (i.e. a form of multi-static processing within the array itself). By transmitting separable signals from each of M transmitter elements, then capturing and processing the reflected signals from each of M transmitters in each of the N receiver elements, it is possible to form a number of beams equal to the product of the transmitter and receiver element numbers N×M. Typically this may be achieved by transmitting from each element in turn (time division multiplexing), or by simultaneously transmitting separable code sequences from each element (code division multiplexing), or by simultaneously transmitting differing frequency sequences (for instance orthogonal frequency division multiplexing). The code sequences required for signal separability can also serve the need for pulse compression.

The use of time division multiplexing, code division multiplexing, orthogonal frequency division multiplexing, combinations of these, and other coding techniques for applications in MIMO radar systems are discussed in the inventors earlier field international applications PCT/AU2007/000033, PCT/AU2008/000628 and PCT/AU2008/001386 now assigned to the applicant all of which are incorporated herein by reference.

Figure 1:
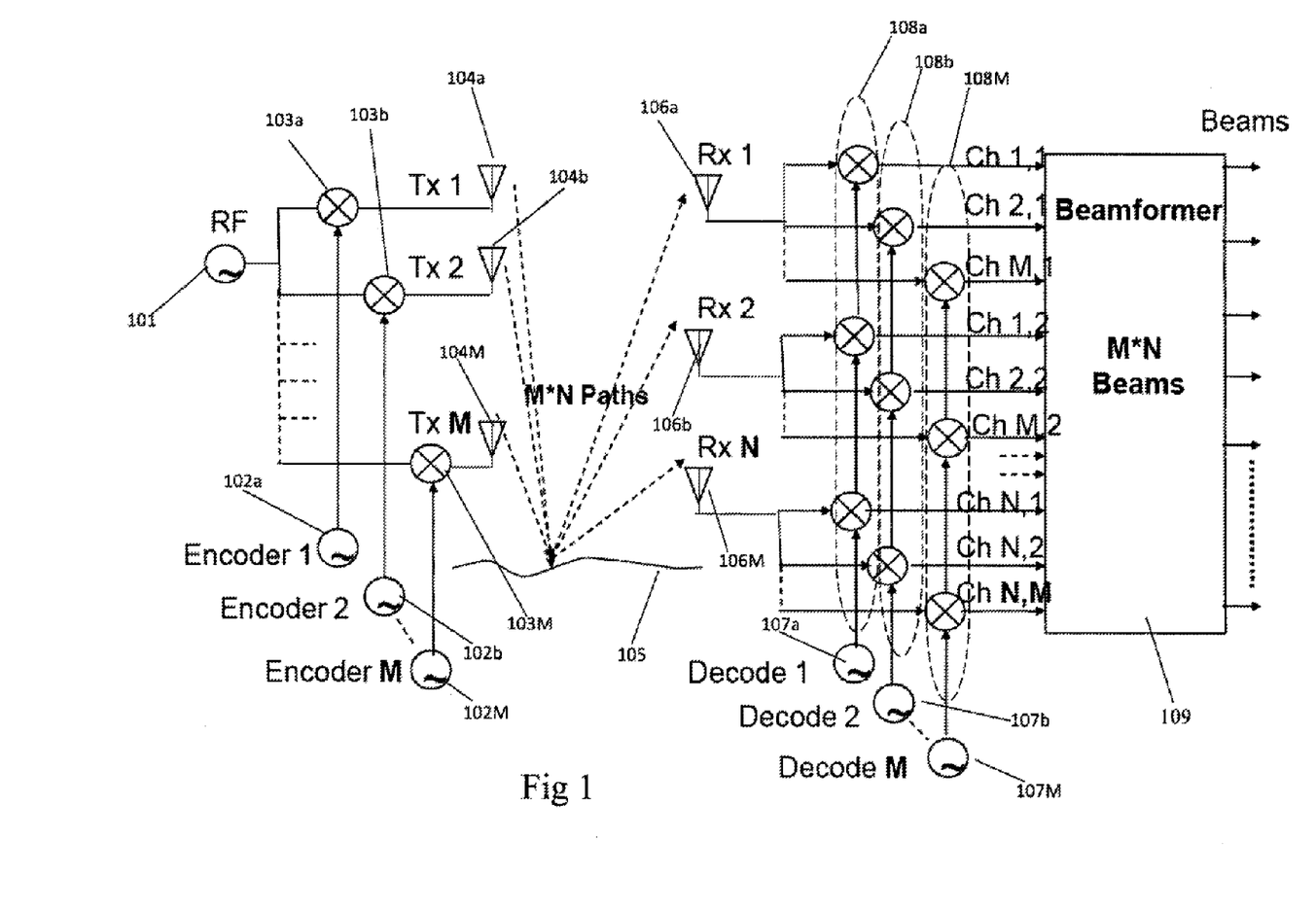
FIG. 1 is a schematic diagram of MIMO radar system according to one embodiment of the present invention.

FIG. 1 illustrates the concept of synthesising multiple beams under the MIMO technique. In this particular example the coding scheme is modulated onto a carrier 101 by encoders 102a, 102b, . . . , 102M via mixers 103a, 103b, . . . , 103M to produce a set of M discrete coded signal, before being transmitted toward the area of interest 105 from transmitting elements 104a, 104b, . . . , 104M.

A set of reflected encoded signals are received by each receiver element 106a, 106b, . . . , 106N, each receiver element captures reflected signals corresponding to the transmitted from each of the transmitter elements Tx1, Tx2, . . . , TxM. The received encoded signals are then decoded by applying a decode signal 107a, 107b, . . . , 107M to each of the received signals captured ([Rx11, Rx12, . . . , Rx1M], [Rx21, Rx22, . . . , Rx2M], . . . , [RxN1, RxN2, . . . , RxNM]) by each of the receiver 106a, 106b, . . . , 106N via banks of mixers 108a, 108b, . . . , 108N. This produces a set of [1, 2, . . . , M] received channels for each receiving element 106a, 106b, . . . , 106N, which are then set to a beamforming unit 109 to produce M×N beams.

The proposed radar altimeter according to one embodiment of the present invention utilises a downward looking MIMO phased array to form multiple beams, covering a relatively wide sector, +/−60 degrees or thereabouts. The distance to the ground is then measured in each beam allowing the ground profile to be formed. The beams may be tilted forward to cover from +90 degrees forward (horizontal) to 30 degrees behind nadir. The provision of such a forward tilt gives a greater degree of coverage in the direction of approach vector to the ground. This additional cover enables the altimeter to more accurately detect other vehicles in the proximity to the current approach vector of the vehicle to the desired landing zone. Such functionality is exceedingly desirable in instance where multiple vehicles are to be landed within a limited space e.g. a deck of an aircraft carrier etc.

Figure 2A:
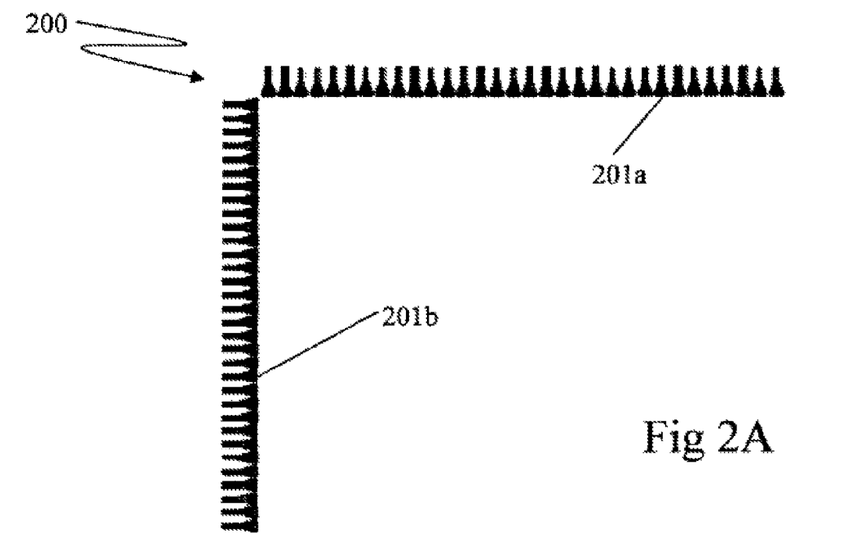
FIG. 2A is a schematic diagram of an antenna array for use in a MIMO radar altimeter according to one embodiment of the present invention.
Figure 2B:
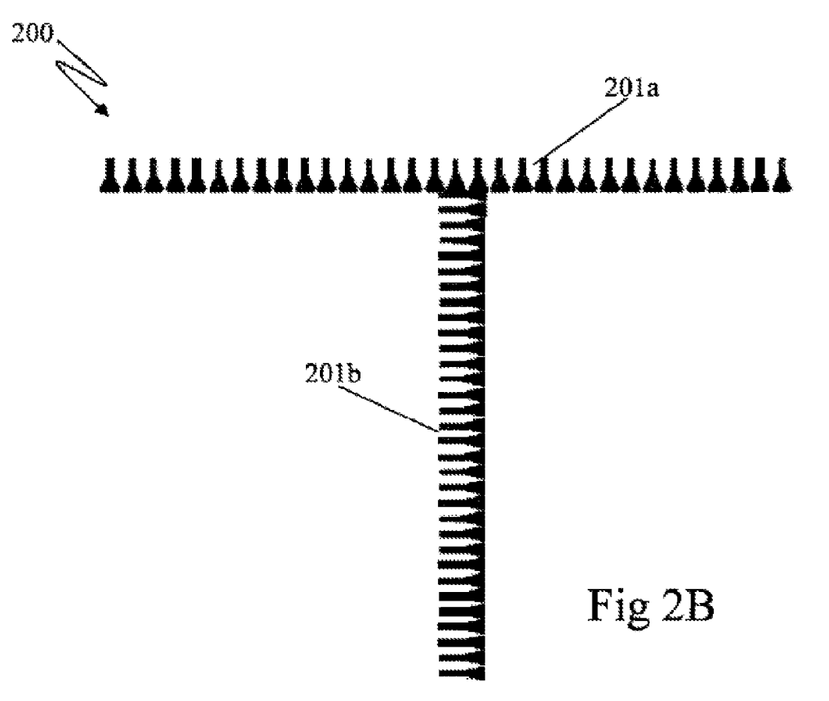
FIG. 2B is a schematic diagram of an antenna array for use in a MIMO radar altimeter according to further embodiment of the present invention.
Figure 2C:
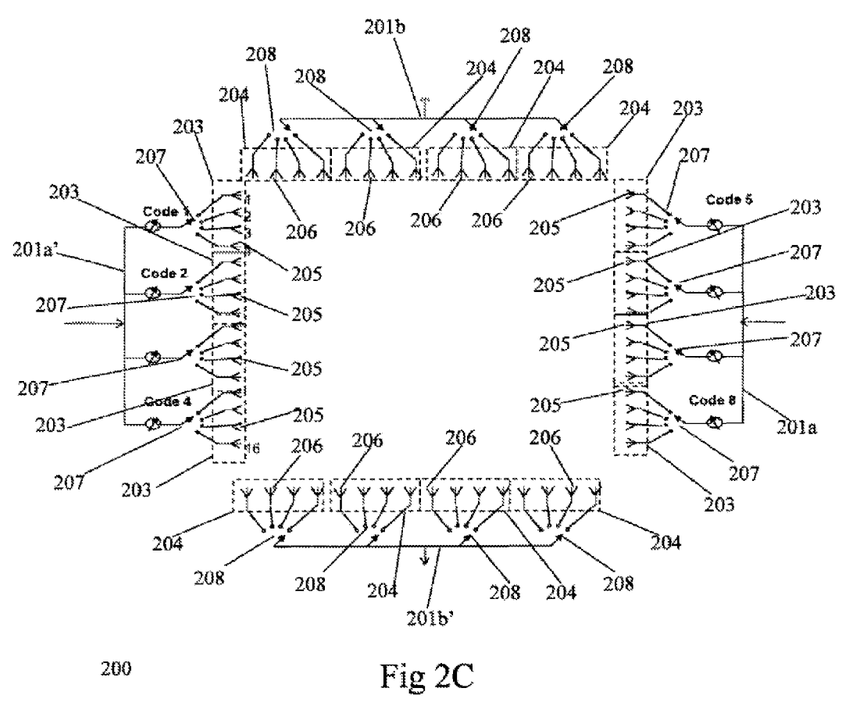
FIG. 2C is a schematic diagram of an antenna array for use in a MIMO radar altimeter according to yet a further embodiment of the present invention.

A number of possible configurations of a suitable array 200 are illustrated in FIGS. 2A to 2C. FIG. 2A depicts an open array 200 arrangement which is formed from two sub-arrays 201a, 201b, one a transmitter array and one receiver array arranged substantially orthogonal to one another such that they form an L shape. An alternative open array construction 200 is shown in FIG. 2B in this case the sub-arrays 201a, 201b have been arranged to form a T shape. Again the sub-arrays 201a, 201b are aligned substantially orthogonal to one another.

FIG. 2C depicts one possible configuration of a dosed array 200 which is more commonly referred to as perimeter array. As shown the array includes 32 transmitter elements and 32 receiver elements arranged into four sub-arrays. Two transmitter sub-arrays 201a, 201a' disposed on opposing side of the array and orthogonal to the two receiver sub-arrays 201b, 201b'.

Each of the transmitter sub-arrays 201a, 201a' includes 16 antenna elements arranged in banks 203 of four antennas 205. Each transmission bank 203 is coupled to a switching network 207. The selection of which transmission elements 205 are active during the transmission cycle is determined by the switching network 207 which opens and closes the appropriate switches to activate the appropriate antenna element 203 based on the chosen multiplexing scheme.

As with the transmitter sub-arrays 201a, 201a' the receiver sub-arrays 202b, 202b' are arranged into banks 204 of four antenna elements 206. Each receiver bank 204 is coupled to a switching network 208 which passes the signals received by the active receiver elements 206 to the backend processing section.

Preferably each of the antenna elements in the sub-arrays 201a, 201a' and 202b, 202b' have the same polarisation. The antenna elements should also be selected to provide sufficient beam☐width (element directional pattern) to illuminate a sufficient area direct beneath and beyond the extremities of the vehicle e.g. +/☐60 degrees in along track and cross track. The spacing between the elements would need to be slightly greater than a half wavelength sufficient to synthesise 32 beams within the +/☐60 degree element beam. While the array shown in FIG. 2C is a square parameter array it will be appreciated by those skilled in the art that the array may be in the form of any suitable shape where multiple combinations of transmitter/receiver pairs allow the formation of a filled aperture. Such configurations might include a rectangle, a T or L shape, a circle, octagon or the like. Alternatively a parallel pair of transmitters displaced from an orthogonal pair of parallel receiver arrays (i.e., formed as ||=) can be used where it is desirable to minimise transmitter to receiver leakage.

Figure 3:
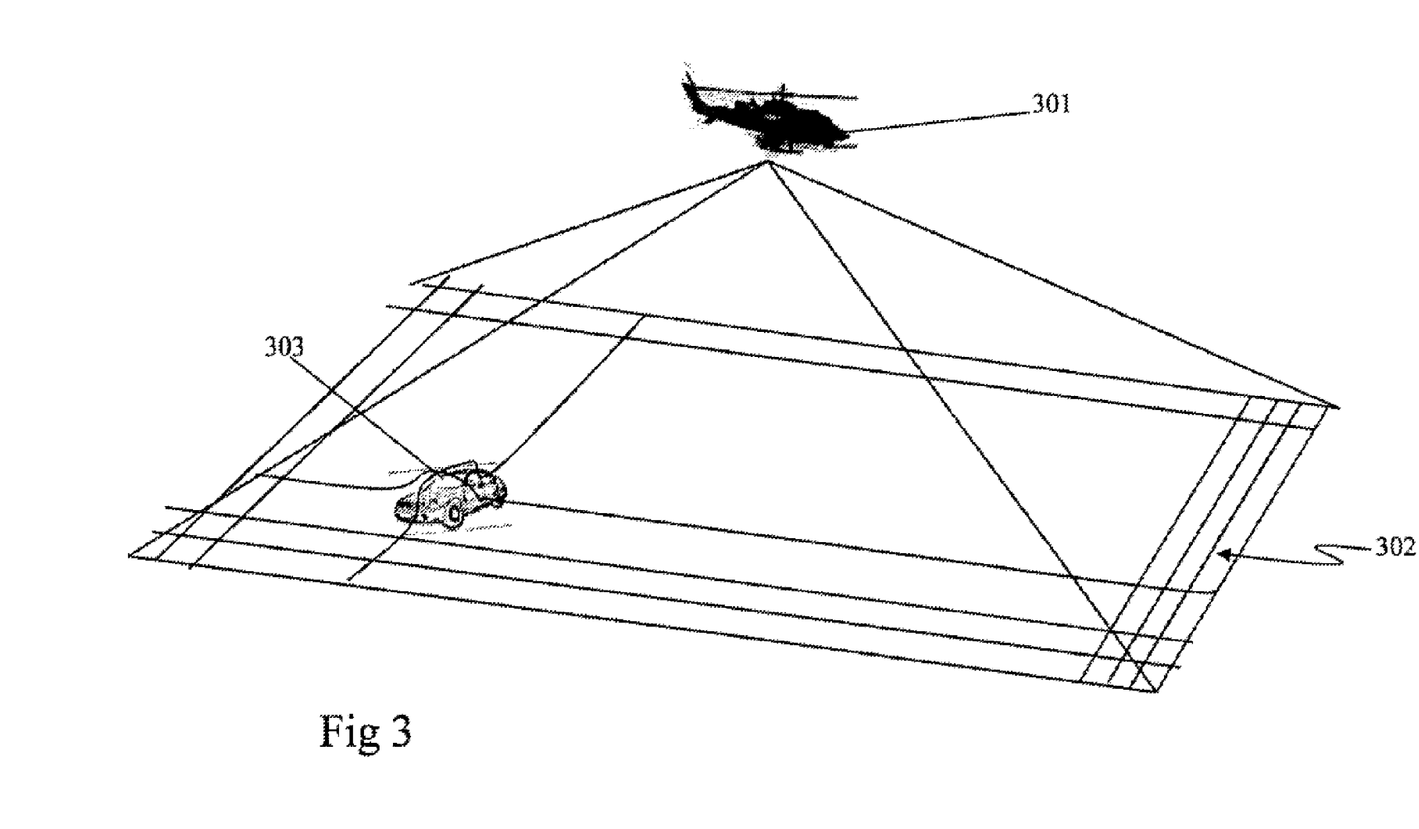
FIG. 3 is a schematic diagram depicting landing area surveying operation performed by a MIMO radar altimeter according to one embodiment.

FIG. 3 depicts the use of a MIMO array in a ground profiling operation in a radar altimeter according to one embodiment of the present invention. As shown the aircraft 301 scans of the desired landing zone 302. The synthesised beams each form a narrow cone. Hence the illuminated patch 302 is wide at higher altitudes. However, as the aircraft 301 descends smaller features of the ground profile can be resolved.

Each of the transmitter elements 203 in the array 200 radiate a sequence of M differing signals, the ground reflections from which are captured by each of the N receiver element 206 of the array. Each of the N receiver elements then separates out the received ground reflections from the M transmitters to produce M×N differing received channels.

The channels are formed into M×N beams by co-phasing the data channels to remove the phase shifts associated with a particular angle of arrival and then summing. Then by suitably filtering the data in each beam a set of range profiles is formed, thereby allowing the time delay of the return signal via the nearest point in each beam be measured and converted to a distance. These distance measures are then converted into a profile showing the ground and any obstacles 303 on the ground, allowing the suitability of a selected landing zone to be assessed.

To maintain a robust terrain profile, in the presence of the slow fades typically encountered by radar altimeters in hovering vehicles, a signal detector with a short sampling widow is utilised. The signal detector measures the range to the nearest point in each beam with leading edge trackers which search out from zero range to detect the first return. The first return in each beam is then tracked with a suitable early-late gate or similar. If the signal fades the tracker stays locked for a short interval and if the signal has not returned in this interval the tracker repeatedly searches out from zero again until it can lock onto the return signal.

The resultant ground profile may be displayed to the pilot for assessment as a contour plot or as a mesh plot. This would allow the pilot to independently judge which regions within a surveyed area may be suitable landing sites. The altimeter may employ an algorithm to automatically determine the suitability of surveyed area for landing. The algorithm may incorporate such considerations as whether there is adequate rotor/wing clearance, whether the ground slope is sufficiently parallel to the landing gear and determining the height at which any obstacles on the landing zone project above the landing surface, in order to decide which regions within a surveyed area are suitable for landing. Areas identified as suitable and unsuitable could then be displayed to the pilot via display unit to thither assist the pilot in the selection of a landing zone. An audible warning may also be provided if the ground in view has a profile falling outside the specification for a safe landing. If a vertical reference is available the display could be referenced to this, otherwise the terrain display would be referenced to the pitch and roll of the vehicle. In this case the image of the ground profile would tilt according to the vehicle's angle with respect to the ground.

It should be noted that not only are the transmitted signals required to be readily separable to produce a useful image of the ground profile, there also need to have a sufficient bandwidth for a range resolution suited to the required height measuring accuracy. Typically a radar altimeter with a leading edge tracker can deliver the required accuracy (+/−2 ft) with a 20 ns pulse, but waveforms which can be time☐compressed to that length (pulse compression) are also suitable.

The above discussion focuses on the use of the MIMO technique to produce a multi-beam radar altimeter capable of producing a highly accurate ground profile image. As mentioned above one of the other major problems effecting landing and takeoff operations of vertical takeoff vehicles is that of brownout. Most Radar altimeters can function under such conditions and there performance is not degraded due to the interference caused by the dust particles etc. The selection of the type of transmission signal plays a significant role in overcoming such performance issues. Radar transmissions in the millimetre wavelength of the spectrum are capable of readily penetrating through dust, smoke or other such particulate clouds. Thus by apply to each of the transmitter elements of the array, a short pulse of wavelength in the order of a few millimetres (e.g. 4.3 GHz or 16.3 GHz) the altimeter can readily image the terrain beneath the vehicle during a brownout, or similar events.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

I claim:

1. An imaging system for profiling an area of interest, said system comprising:
    a plurality of transmitter elements, wherein each transmitter element transmits a plurality of coded signals toward the area of interest;
    a plurality of receiver elements, each receiver element receiving a plurality of return signals corresponding to the transmitted coded signals from the area of interest; and
    at least one processor, said processor being adapted to:
        separate the return signals for each transmitter to receiver path received by each of the receiver elements to form a plurality of data channels;
        form a plurality of beams from the plurality of data channels by co-phasing the data channels to remove phase shifts associated with each of the received signals angle of arrival and sum each set of return signals received by each receiver and wherein each beam includes a first received signal;
        produce a set of range profiles from data contained in each of the plurality of beams;
        measure the distance to the nearest point in each beam based on delay time for receipt of the first return signal from each beam;
        produce a terrain profile of the area of interest from the distance measures; and
        display an image of the terrain profile of the area of interest.

2. The imaging system of claim 1, wherein the coded signals are transmitted in accordance with a time division multiplexing scheme, wherein the delay between the transmission of each coded signal is sufficient to allow all return signals from the area of interest to dissipate before transmitting the next coded signal.

3. The imaging system of claim 1, wherein the coded signals each comprise a different signature code.

4. The imaging system of claim 3, wherein each signature code is formed by a linear frequency sweep at staggered intervals.

5. The imaging system of claim 3, wherein each signature code is formed as a differing code sequence of pulses at the same frequency.

6. The imaging system of claim 5, wherein each signature code is formed by a phase modulation or an amplitude modulation, which includes PSK modulation or QAM modulation.

7. The imaging system of claim 1, wherein the plurality of coded signals are transmitted in accordance with a frequency division multiplexing (FDM) scheme, including OFDM.

8. The imaging system of claim 7, wherein the coded signals each comprise a different signature code, each signature code having a unique carrier frequency selected from a set of predetermined frequencies to allow the at least one processor to separate out return signals for each transmitting element that reflected the area of interest.

9. The imaging system of claim 8, wherein the carrier frequencies of the pulses are cycled incrementally after each transmission, such that each transmitter element transmits a full set of pulses covering all the predetermined frequencies.

10. The imaging system of claim 1, wherein the pulses are transmitted in accordance with an orthogonal frequency division multiplexing (OFDM) scheme.

11. The imaging system of claim 10, wherein coded signals each comprise a different signature code, each signature code having a unique carrier frequency selected from a set of predetermined frequencies to allow the at least one processor to separate out return signals for each transmitting element reflected the area of interest.

12. The imaging system of claim 10, wherein the transmission of the coded signals is staggered, whereby each transmitter element transmits a different carrier frequency within the sequence of coded signals to that of the adjacent transmitter elements.

13. The imaging system of claim 1, wherein the transmitter and receiver element patterns cover about +/−60 degrees in along track and cross track.

14. The imaging system of claim 1, wherein the transmitter and receiver element patterns are tilted forward to cover from +90 degrees forward-horizontal to 30 degrees behind nadir.

15. The imaging system of claim 1, wherein the coded signals radiated by each transmitter element are in the microwave or millimeter portion of the electromagnetic spectrum.

16. The imaging system of claim 1, wherein the terrain profile is displayed as a mesh plot or contour plot.

17. The imaging system of claim 1, wherein the profile is further processed to determine a substantially level area within the area of interest.

18. The imaging system of claim 17, wherein the substantially level area is identified on the terrain profile.

19. The imaging system of claim 17, wherein a warning is displayed if no substantially level area can be identified.

20. The imaging system of claim 19, wherein the warning further comprises an audible warning.

21. The imaging system of claim 1, wherein the transmitter and receiver elements comprise transmitter and receiver sub-arrays, respectively.

22. The imaging system of claim 21, wherein the transmitter and receiver sub-arrays are arranged orthogonal to one another.

23. The imaging system of claim 21, wherein each element within the sub-arrays is connected in sequence another element to reduce the number of active devices.

24. The imaging system of claim 3, wherein pulse compression is applied.

25. The imaging system of any claim 1, wherein the formation of the plurality of beams further comprises phase shifting each of the separated received reflected signals from each receiver element.

26. The imaging system of claim 1, wherein the first signal returned in each beam is tracked.

27. The imaging system of claim 1, wherein the processor is further adapted to compare the terrain profile with a threshold value denoting the slope, level clearance, and flatness to safely land an airborne vehicle within the area of interest and display suitable and unsuitable areas to the aircrafts operator.

28. A method of surveying an area of interest to produce a terrain profile, said method comprising:
  transmitting from a plurality of transmitter elements a plurality of coded signals toward the area of interest;
  receiving at a plurality of receiver elements, a plurality of return signals corresponding to the transmitted coded signals from the area of interest;
  separating the return signals for each transmitter to receiver path received by each of the receiver elements to form a plurality of data channels;
  forming a plurality of beams from the plurality of data channels by co-phasing the data channels to remove phase shifts associated with each of the received signals angle of arrival and sum each set of return signals received by each receiver, wherein each beam includes a first received signal;
  producing a set of range profiles from data contained in each of the plurality of beams;
  measuring the distance to the nearest point in each beam based on delay time for receipt of the first received signal from each beam;
  producing a terrain profile of the area of interest from the distance measurements; and
  displaying the terrain profile.

29. The method of claim 28, wherein the coded signals radiated by each transmitter element is in the microwave or millimeter portion of the electromagnetic spectrum.

30. The method of claim 28, wherein displaying the terrain profile comprises displaying the terrain profile as a contour plot or mesh plot.

31. The method of any one of claim 28, further comprising:
  processing the terrain profile to identify a substantially level area within the area of interest for display on the terrain profile.

32. The method of claim 31, wherein an audible or a visual warning is given if no substantially level area can be identified.

33. The method of claim 31, wherein the substantially level area within the area of interest is analysed to determine if the substantially level area provides adequate clearance to set down an airborne vehicle.

* * * * *